United States Patent [19]

Gutleber

[11] Patent Number: 4,471,342

[45] Date of Patent: Sep. 11, 1984

[54] PULSE COMPRESSOR FOR MULTIPLEXED NOISE CODES

[75] Inventor: Frank S. Gutleber, Little Silver, N.J.

[73] Assignee: The United States of America as represented by the Secretary of the Army, Washington, D.C.

[21] Appl. No.: 456,157

[22] Filed: Jan. 6, 1983

[51] Int. Cl.³ .......................................... H03K 13/24
[52] U.S. Cl. ............................. 340/347 DD; 370/18; 375/25; 375/38
[58] Field of Search .................................. 370/18–22, 370/53, 69.1, 77, 85, 104, 116; 375/1, 25, 38, 96, 102, 104; 340/348, 349, 346, 347 DD; 455/306; 364/604, 725, 728, 819, 826

[56] References Cited

U.S. PATENT DOCUMENTS 3,461,451 8/1969 Gutleber ............................ 340/348
3,917,999 11/1975 Gutleber ................................ 375/1
3,947,674 3/1976 Gutleber .......................... 370/18 X

OTHER PUBLICATIONS

Weik, Martin H., *Communications Standard Dictionary*, Van Nostrand Reinhold Company, 1983, pp. 56, 200.

Primary Examiner—Robert L. Griffin
Assistant Examiner—Albert W. Watkins
Attorney, Agent, or Firm—Anthony T. Lane; Sheldon Kanars; Jeremiah G. Murray

[57] ABSTRACT

A pulse compressor for multiplexed noise codes generated with transposed code mate pairs and which comprise expanded noise codes of the code mates where the first expanded code is generated by delaying the inverse of one code mate by a predetermined time delay and adding it to the other code mate and wherein the second expanded code is generated by delaying the inverse of the other code mate, forming its complement and adding it to said one code mate. The means utilized comprises means for compressing the two expanded codes collectively by summing and differencing of the codes in a repetitive pipelined sequence until a final pair of codes are outputted which are lobeless and equal to the basic mate pair.

3 Claims, 2 Drawing Figures

4,471,342

PULSE COMPRESSOR FOR MULTIPLEXED NOISE CODES

The invention described herein may be manufactured, used and licensed by or for the Government for governmental purposes without the payment to me of any royalties thereon.

CROSS REFERENCE TO RELATED APPLICATION

This invention is related to the co-pending application Ser. No. 449,029 entitled, "Multiplexed Noise Code Generator Utilizing Transposed Codes" (CERCOM D-2037) filed in the name of Frank S. Gutleber, the present inventor, on Dec. 13, 1982.

1. Field of the Invention

This invention relates generally to multiplexed noise codes having autocorrelation functions which upon matched filter detection provide an impulse, i.e., a lobeless autocorrelation function and more particularly to the compression of expanded multiplexed noise codes into a basic code mate pair which are lobeless.

2. Background of the Invention

Noise codes comprised of what is termed code mate pairs are well known. Such codes have autocorrelation functions which upon matched filter detection provide lobeless impulse signals. It is also well known that typical means of compressing such a code mate pair is to employ a passive matched filter in the form of a separate tapped delay line for each code, with the output of the taps matched to the input code bits in reverse order to the input sequence. The linear summation of the matched outputs of each delay line then provides the compressed code for each code of the mate pair. Each output is equal to the autocorrelation function of the respective code being detected and the simple linear sum of the two outputs results in a lobeless compressed mate pair.

Such a configuration becomes relatively expensive and difficult to implement for very long codes since a separate tap with or without an inverter is required for each bit of the input code. Such long codes typically comprise expanded codes from a basic code mate pair and typically involves butting, interleaving, partial interleaving, or overlapping one code mate with the other code mate where, for example, one of the codes is delayed by a value equal to the code length of the two mate pairs in the expansion process. A typical example of such techniques is shown and described in U.S. Pat. No. 3,461,451, entitled, "Code Generator To Produce Permutations Of Code Mates," issued to Frank S. Gutleber, the present inventor, on Aug. 12, 1969. Another example comprises codes generated in accordance with the invention disclosed in the above referenced co-pending application entitled, "Multiplexed Noise Code Generator Utilizing Transposed Codes," wherein expanded multiplexed noise codes including code mate pairs having autocorrelation functions, which upon detection provide an impulse autocorrelation function, are generated by delaying the inverse of one of the code mate pairs by a value equal to the code length and adding it to the other code mate pair to form a first expanded code mate, while a second expanded code mate is generated by delaying the inverse of the other code also by a value equal to the code length, forming the complement thereof and adding it to the first mentioned code mate, forming what is generally referred to as transposed codes. It is to this latter type of code generation that the present invention particularly pertains.

SUMMARY OF THE INVENTION

Accordingly, it is an object of the present invention to provide an improvement in the detection of multiplexed noise codes.

Another object of the invention is to provide improvement in the compression of multiplexed noise codes.

Still another object of the present invention is to provide an improvement in the compression of expanded multiplexed noise code pairs.

And yet another object of the present invention is to provide an improvement in the compression of expanded multiplexed noise codes generated with transposed codes of multiplexed noise code mate pairs.

These and other objects are achieved by a means for compressing a pair of expanded codes which have been generated from a basic code mate pair where the first expanded code is comprised of the combination of one code mate and the inverse of the other while the other expanded code is comprised of the combination of the other basic code mate and the inverse complement of the first code mate. Code compression of the expanded code mate pairs is accomplished collectively rather than individually by a repetitive summing and subtracting process in successive stages whereby the coherent compression of the expanded code back down to a lobeless basic mate pair is accomplished. In one embodiment, one expanded mate pair is summed with the inverse of the other expanded mate pair, thereby forming a first compressed code mate of one half the original code length, while a second compressed code mate of half the code length is formed by differencing the second expanded code mate and the inverse of the first expanded code mate. In a second embodiment, the compression is obtained with only a single code sequence inversion and appropriate time delays.

DESCRIPTION OF THE PREFERRED EMBODIMENT

Figure 1:
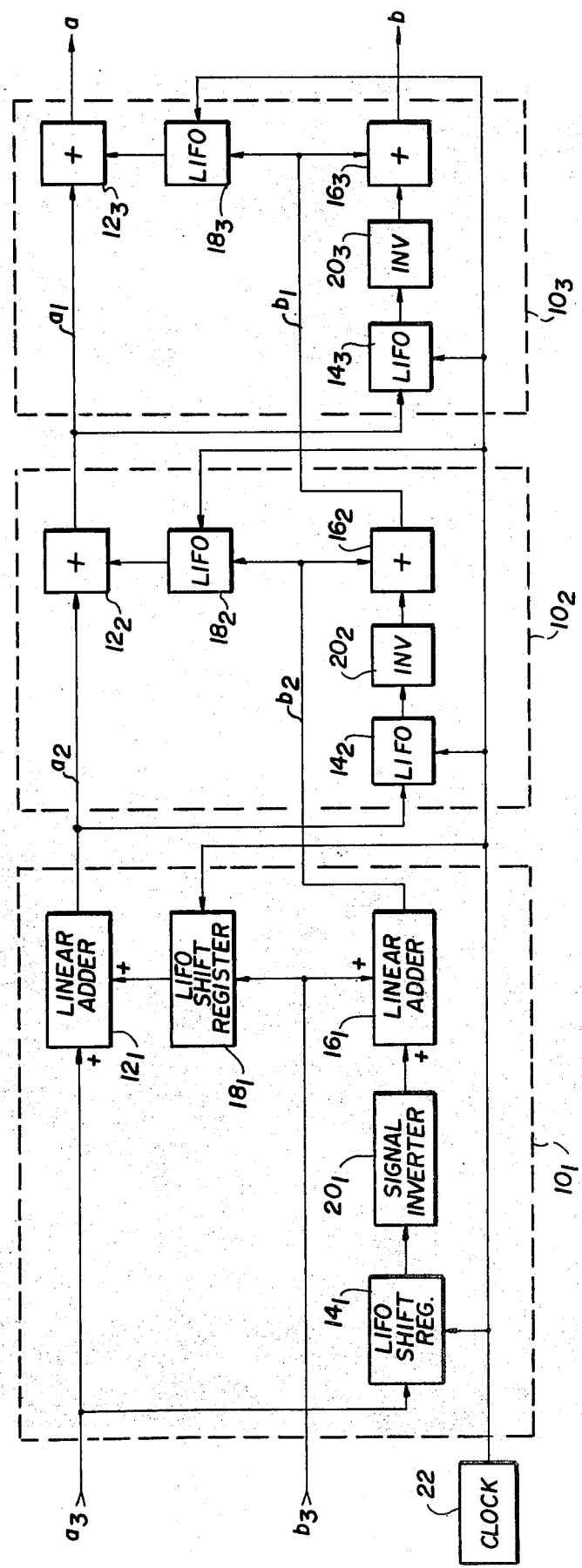
FIG. 1 is a functional block diagram illustrative of a first embodiment for compressing expanded multiplexed noise code pair mates in accordance with the subject invention.

The present invention is directed to compression of a type of expanded multi-bit digital codes referred to as noise codes, meaning that they have autocorrelation functions which upon detection provides an impulse. In particular, one class of noise codes are known wherein pairs of coded signals termed "code mates" have respective autocorrelation functions which provide a peak output at a given time and a zero output or outputs having the same magnitude but opposite polarity at all other times. When code mates, for example, are orthogonally multiplexed, matched filter detected and linearly added, there is provided a lobeless impulse output of a relatively high amplitude at a given time and a zero output at all other times.

Expressed mathematically, for a pair of code mates a and b, $\phi_a(\tau) = -\phi_b(\tau)$ for all $\tau \neq 0$, where $\phi_a(\tau)$ is the autocorrelation function of code a and $\phi_b(\tau)$ is the autocorrelation function of code b.

The pulse compression to be subsequently described provides an improved means for compressing to a lobeless impulse a multiplexed noise code pair for code mates that are expanded in accordance with the following expression:

$$\text{Code } A = a, \underline{\bar{b}} \qquad (1)$$

$$\text{Code } B = b, \underline{\bar{a}} \qquad (2)$$

Where A and B comprise an expanded code mate pair generated from Codes a and b which comprise a basic mate pair, and wherein: $\underline{x}$ is the inverse of code sequence x, i.e. $x_1, x_2, x_3$ becomes $x_3, x_2, x_1$; $\bar{x}$ is the negative or complement of code x; and the (,) in a code sequence x, y signifies that the subelement or code sequence y follows code sequence x by some time delay $\tau_i$.

In the expansion process of code mate pairs in accordance with equations (1) and (2), any one of the four subelements or code sequences (a, b, $\underline{a}$ or $\underline{b}$) making up the expanded code can be inverted or complemented as well as interchanged such that for example, $$\text{Code } A = a, \underline{b} \qquad (3)$$

$$\text{Code } B = b, \underline{\bar{a}} \qquad (4)$$

or, $$\text{Code } A = b, \underline{\bar{a}} \qquad (5)$$

$$\text{Code } B = a, \underline{b} \qquad (6)$$

In all such instances, the expanded code pairs A and B meet the requirements for forming a code mate pair.

In view of the foregoing, consider now the following code mate pair $A = a_3$ and $B = b_3$ that is generated in accordance with repeated application of the expansion rules set forth in equations (1) and (2), bearing in mind that expansions according to equations (3) through (6) could also be utilized, when desired. For a basic code mate pair a and b, a first expansion results in codes $a_1$, $b_1$ being developed as follows:

$$a_1 = a, \underline{\bar{b}} \qquad (7)$$

$$b_1 = b, \underline{\bar{a}} \qquad (8)$$

Expanding code mates $a_1$ and $b_1$ in a second expansion process provides a mate pair $a_2$ and $b_2$, which can be expressed as follows:

$$a_2 = a_1, \underline{\bar{b}_1} = a, \underline{\bar{b}}, \underline{\bar{a}}, \underline{\bar{b}} \qquad (9)$$

$$b_2 = b_1, \underline{\bar{a}_1} = b, \underline{\bar{a}}, \underline{\bar{b}}, \underline{\bar{a}} \qquad (10)$$

A third expansion, involving now the code mates $a_2$ and $b_2$, results in code mates $a_3$ and $b_3$ being developed in the following manner:

$$a_3 = a_2, \underline{\bar{b}_2} = a, \underline{\bar{b}}, \underline{\bar{a}}, \underline{\bar{b}}, \underline{\bar{a}}, \underline{b}, \underline{\bar{a}}, \underline{\bar{b}} \qquad (11)$$

$$b_3 = b_2, \underline{\bar{a}_2} = b, \underline{\bar{a}}, \underline{\bar{b}}, \underline{\bar{a}}, \underline{\bar{b}}, \underline{a}, \underline{\bar{b}}, \underline{a} \qquad (12)$$

As is known, having been shown and described, for example, in the above reference related application Ser. No. 449,029, entitled, "Multiplexed Noise Code Generator Utilizing Transposed Codes," codes $a_3$ and $b_3$ form a mate pair wherein $\phi a_3(\tau) = -\phi b_3(\tau)$ for all $\tau \neq 0$ and accordingly can be compressed to a lobeless impulse. The present invention accordingly is directed to a means for compressing expanded code mate pairs such as developed in equations (7) through (12) in a collective manner rather than individually, as in prior art practice, where separate tapped delay lines for each code are used and wherein the output of the taps of the delay lines are matched to the input code bits in reverse order to the input sequence providing thereby a complex conjugate of the input bits.

The present invention results from an inspection of the foregoing expansion process which reveals that a repeated application of the following general operation will coherently compress the expanded code mate back to a lobeless basic mate pair, namely:

$$a_{i-1} = a_i + \underline{b}_i \qquad (13)$$

$$b_{i-1} = b_i - \underline{a}_i \qquad (14)$$

An appropriate time delay $\tau_i$ is required to line up the compressed bits at each stage and/or account for the delay introduced with the code inverter where, for example, the inverter comprises a last-in/first-out (LIFO) code sequence inverter.

Since equations (13) and (14) involve code inversions of the expanded codes $A = a_3$ and code $B = b_3$ as expressed in equations (11) and (12), inverted sequences thereof, i.e. $\underline{a}_3$ and $\underline{b}_3$ can be expressed as follows:

$$\underline{A} = \underline{a}_3 = \bar{b}, \underline{\bar{a}}, b, \underline{\bar{a}}, \bar{b}, \underline{\bar{a}}, \bar{b}, a \qquad (15)$$

$$\underline{B} = \underline{b}_3 = a, \underline{\bar{b}}, \underline{\bar{a}}, \underline{\bar{b}}, a, \underline{\bar{b}}, a, \underline{b} \qquad (16)$$

Applying code compression equation (13) to codes $a_3$ and $b_3$ results in a code sequence $a_2$ being obtained which is one half the code length of $a_3$ and which is formed as illustrated below as:

$$\begin{aligned} a_3 &= a, \underline{\bar{b}}, \underline{\bar{a}}, \underline{\bar{b}}, \underline{\bar{a}}, \underline{b}, \underline{\bar{a}}, \underline{\bar{b}} \\ +\underline{b}_3 &= a, \underline{\bar{b}}, \underline{\bar{a}}, \underline{\bar{b}}, a, \underline{\bar{b}}, a, \underline{b} \\ \hline a_2 &= a_3 + \underline{b}_3 = a^2, \underline{b}^2, \overline{a}^2, \underline{\bar{b}}^2, \ldots, \, , \, . \end{aligned} \qquad (17)$$

where the exponent indicates the amplitude of the respective codes.

In a like manner, the code mate $b_2$ is developed in accordance with equation (14) in the following manner:

$$\begin{aligned} b_3 &= b, \underline{a}, \underline{\bar{b}}, \underline{a}, \bar{b}, \underline{\bar{a}}, b, \underline{a} \\ -\underline{a}_3 &= b, \underline{a}, \bar{b}, \underline{a}, b, \underline{a}, b, \underline{\bar{a}} \\ \hline b_2 &= b_3 - \underline{a}_3 = b^2, \underline{a}^2, \bar{b}^2, \underline{a}^2, \ldots, \, , \, . \end{aligned} \qquad (18)$$

The inversion process in developing equation (17) means inverting not only the code sequence of $\underline{b}_3$ but also changing all the subelements so that, for example, $\underline{x}$ becomes x and x becomes $\underline{x}$. In the difference equation (18) the subtracted term, i.e. $\underline{a}_3$ is complemented such that x becomes $\bar{x}$ and $\bar{x}$ becomes x and a summation is thereafter made.

Similarly, compressed code mates $a_1$ and $b_1$ are obtained in accordance with the foregoing mathematical operations as follows:

$$a_2 = a^2, \tilde{b}^2, \bar{a}^2, \tilde{b}^2 \quad (19)$$
$$\underline{+\tilde{b}_2 = a^2, \tilde{b}^2, a^2, \tilde{b}^2}$$
$$a_1 = a_2 + \tilde{b}_2 = a^4, \tilde{b}^4, \ldots$$

and, $$b_2 = b^2, \underline{a}^2, \overline{b}^2, \underline{a}^2 \quad (20)$$
$$\underline{-\underline{a}_2 = b^2, \underline{a}^2, b^2, \underline{a}^2}$$
$$b_1 = b_2 - \underline{a}_2 = b^4, \underline{a}^4, \ldots$$

A third compression results in providing the basic code mates a and b but whose amplitude is amplified by a factor of 8. This is obtained as shown below:

$$a_1 = a^4, \tilde{b}^4 \quad (21)$$
$$\underline{+\tilde{b}_1 = a^4, \tilde{b}^4}$$
$$a = a_1 + \tilde{b}_1 = a^8, \ldots$$

and, $$b_1 = b^4, \underline{a}^4 \quad (22)$$
$$\underline{-\underline{a}_1 = b^4, \bar{a}^4}$$
$$b = b_1 - \underline{a}_1 = b^8, \ldots$$

Referring now to FIG. 1, there is disclosed a functional block diagram of means which is operable to compress the expanded code mate pair $a_3$ and $b_3$ in conformance with equations (13) and (14). As shown, the code compressor is comprised of a combination of linear adders, last-in/first-out (LIFO) shift registers which operate as sequence inverters to invert a sequence where, for example, $x_1, x_2, x_3$ becomes $x_3, x_2, x_1$ and signal inverters which operate to provide the complement of the input code, for example, x becomes $\bar{x}$.

The compressor shown in FIG. 1 is comprised of three compressor stages $10_1$, $10_2$ and $10_3$. The first stage $10_1$ is shown coupled to a pair of input codes comprising the code mate pair $a_3$ and $b_3$ which is compressed in stage $10_1$ to half their respective lengths by means of a linear adder $12_1$ and a LIFO shift register $14_1$ directly coupled to the expanded code mate $a_3$ while the other code mate $b_3$ is directly coupled to a second linear adder $16_1$ and a second LIFO shift register $18_1$. A signal inverter $20_1$ is coupled between the LIFO shift register $14_1$ and a second linear adder $16_1$. A clock 22 is coupled to the two LIFO shift registers $14_1$ and $18_1$ in order to control the read in and read out times of the code sequences of $a_3$ and $b_3$, respectively. It can be seen that the linear adder $12_1$ is operable to add the inverted sequence of code $b_3$ to the sequence of $a_3$ and thus implement equation (13) and output a compressed code mate $a_2$. Code $a_3$ has its bit sequence inverted in the LIFO shift register $14_1$, is complemented with the signal inverter $20_1$ and added to code $b_3$ in the linear adder $16_1$ to implement equation (14) and output a compressed code mate $b_2$.

In a similar manner, the once compressed code mates $a_2$ and $b_2$ are fed to the second compressor stage $10_2$ where a compressed code mate $a_1$ equal to one half the code length of $a_2$ is obtained by inverting the code $b_2$ and adding it to the code $a_2$. In a similar manner, the code sequence of $a_2$ is inverted, complemented and added to the code $b_2$ to compress to the code mate $b_1$.

Duplicating this process once more in the third compressor stage $10_3$ then compresses the code mate pairs $a_1$ and $b_1$ down to the output codes which comprise the basic code mate pairs a and b and which are not only lobeless, but are obtained with significantly less hardware than what is required for conventional compressors.

It should be pointed out that only p compression stages are required to compress an n bit code length down to a single impulse where $2^p = n$. For example, only 10 compression stages would be required to compress a 1024 bit noise code structure down to a lobeless impulse.

An alternative approach to the expanded code compression process will now be described. Assuming for example that the previously disclosed code mate pairs $a_3$ and $b_3$ require compression to a lobeless impulse, if the expanded code $b_3$ is first inverted to $\tilde{b}_3$, then a simple sum and difference with appropriate delays at each subsequent stage will compress the mate pair $a_3$ and $b_3$ down to the basic code mates a and b in the following manner.

At the first stage the codes $a_3$ and $\tilde{b}_3$ are added as shown below to provide the code $a_2$ as follows:

$$a_3 = a, \tilde{b}, \bar{a}, \tilde{b}, \bar{a}, b, \bar{a}, \tilde{b} \quad (23)$$
$$\underline{+\tilde{b}_3 = a, \tilde{b}, \bar{a}, \tilde{b}, a, b, a, b}$$
$$a_2 = a_3 + \tilde{b}_3 = a^2, \tilde{b}^2, \bar{a}^2, \tilde{b}^2, \ldots$$

Likewise, the code $a_3$ is subtracted from $\tilde{b}_3$ to provide the code $b_2$, as:

$$\tilde{b}_3 = a, \tilde{b}, \bar{a}, \tilde{b}, a, b, a, b \quad (24)$$
$$\underline{-a_3 = \bar{a}, b, a, b, a, \tilde{b}, a, b}$$
$$b_2 = \tilde{b}_3 - a_3 = \ldots, a^2, \tilde{b}^2, a^2, \tilde{b}^2$$

In the next or second compression stage, the code $a_2$ is delayed by a time delay $\tau_2$ to yield a code $a'_2$ which is illustrated below as:

$$a'_2 = a_2(t + \tau_2) = \ldots, \bar{a}^2, \tilde{b}^2, \bar{a}^2, \tilde{b}^2 \quad (25)$$

The codes $a'_2$ and $b_2$ are then summed in the following manner to provide the code $a_1$:

$$a_2' = \ldots, a^2, \tilde{b}^2, \bar{a}^2, \tilde{b}^2 \quad (26)$$
$$\underline{+ b_2 = \ldots, a^2, \tilde{b}^2, a^2, \tilde{b}^2}$$
$$a_1 = a_2' + b_2 = \ldots, a^4, \tilde{b}^4, \ldots$$

As before, the difference between codes $b_2$ and $a'_2$ yield the compressed code $b_1$ which is illustrated below as:

$$b^2 = \ldots, a^2, \tilde{b}^2, a^2, \tilde{b}^2 \quad (27)$$
$$\underline{- a_2' = \ldots, \bar{a}^2, \tilde{b}^2, a^2, \tilde{b}^2}$$
$$b_1 = b_2 - a_2' = \ldots, a^4, \tilde{b}^4$$

In the third compression stage, the compressed code $a_1$ is delayed by a time delay $\tau_1$ to provide the code $a'_1$ which is illustrated below as:

$$a'_1 = a_1(t + \tau_1) = \ldots, a^4, \tilde{b}^4 \quad (28)$$

As before, the compressed codes $a'_1$ and $b_1$ are summed together to provide the basic code mate a which has an amplitude increased by a factor of 8 which is illustrated below as:

$$a_1' = \ldots\ldots\ldots\ldots a^4, \underline{b}^4 \qquad (29)$$
$$+ b_1 = \ldots\ldots\ldots\ldots a^4, \underline{b}^4$$
$$a = a_1' + b_1 = \ldots\ldots\ldots\ldots a^8, .$$

Similarly, the codes $b_1$ and $a'_1$ are differenced to provide the basic code mate b which also has an amplitude increased by a factor of 8 and which is also illustrated as:

$$b_1 = \ldots\ldots\ldots\ldots\ldots a^4, \underline{b}^4 \qquad (30)$$
$$- a_1' = \ldots\ldots\ldots\ldots \bar{a}^4, \underline{b}^4$$
$$b = b_1 - a_1' = \ldots\ldots\ldots\ldots\ldots \underline{b}^8$$

Figure 2:
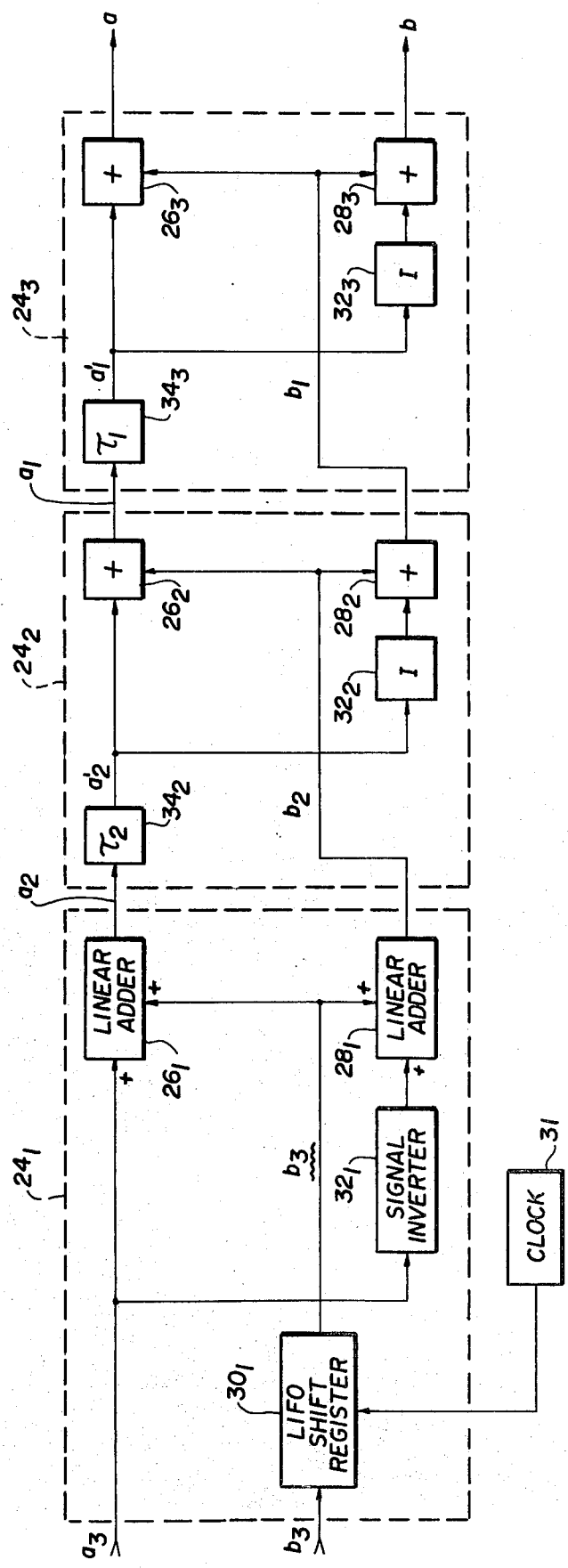
FIG. 2 is a functional block diagram illustrative of a second embodiment for compressing expanded multiplexed noise code pair mates in accordance with the subject invention.

Referring now to FIG. 2, there is disclosed a functional block diagram of a circuit configuration which is operable to compress the expanded code mate pair $a_3$ and $b_3$ in accordance with the above disclosed alternate approach. As shown in FIG. 2, the code compressor is comprised of three compressor stages $24_1$, $24_2$ and $24_3$. The first compressor stage $24_1$ is adapted to receive as inputs the expanded codes $a_3$ and $b_3$ which compress to half their code lengths by means of a pair of linear adders $26_1$ and $28_1$ as well as a LIFO shift register $30_1$ and a signal inverter $32_1$. The LIFO shift register $30_1$ is coupled to and inverts the code $b_3$ which is applied to the linear adder $26_1$ along with the code $a_3$ whereupon a compressed code $a_2$ is provided in accordance with equation (23). The input code $a_3$ is also applied to the inverter $32_1$ where the complement thereof is applied to the second linear adder $28_1$ along with the inverted code $b_3$ to provide the compressed code output $b_2$ in accordance with equation (24).

The second compressor stage $24_2$ includes a first time delay means $34_2$ in the signal channel coupled to the linear adder $26_2$. The LIFO shift register $30_1$ which is included in the first stage $24_1$, is not required and the compressed code $b_2$ is applied directly to the linear adders $26_2$ and $28_2$. The time delay circuit $34_2$ provides a time delay $\tau_2$ which is equal to the code length of code $b_2$. The output of the delay circuit $34_2$ is applied as the code $a'_2$ to the inverter $32_2$ and the linear adder $26_2$. The linear adder $26_2$ accordingly operates to combine the codes $a'_2$ and $b_2$ to provide the compressed code $a_1$ in accordance with equation (26). The linear adder $28_2$ adds the complement of the code $a'_2$ to the code $b_2$ to provide an output of the compressed code $b_1$ in accordance with equation (27).

The third compressor stage $24_3$ is identical in configuration to the second compressor stage $24_2$ with the exception that the time delay means $34_3$ provides a time delay of $\tau_1 = 0.5 \tau_2$ and provides an output code $a'_1$ in accordance with equation (28). The linear adder $26_3$ adds the codes $a'_1$ and $b_1$ to output the basic code mate a according to equation (29). Similarly, the second linear adder $28_3$ sums the complement of the code $a'_1$ with the code $b_1$ to output the other basic code mate b in accordance with equation (30).

The embodiment of the invention shown in FIG. 2 has somewhat of a practical advantage over the embodiment shown in FIG. 1, notwithstanding the requirement of a time delay in each compression stage. This advantage results from the elimination of all but one code sequence inverter which, if optimum coherent compression is to be realized, cannot be a relatively simple standard last-in/first-out non-linear shift register. The sequence inverter must be synchronously timed to the input bit stream, must separately gate out and appropriately delay each bit of the code sequence, and then must linearly add all of the delayed bits. Minimizing the required quantity of sequence inverters for the pulse compressor is therefore very advantageous. However, none would be required at all, if after generating an expanded code $a_n$ and $b_n$ with transposed codes, one of these was then sequence inverted prior to transmission where the sequence inversion could then be achieved with a relatively simple standard LIFO shift register.

Thus what has been shown and described is an improved means for implementing a passive matched filter arrangement which compresses to a lobeless impulse multiplexed noise codes that are expanded with transposed codes of code mate pairs.

Having thus shown and described what is at present considered to be the preferred method and means for embodying the invention, it should be understood that the foregoing detailed description has been made by way of illustration and not limitation. Accordingly, all alterations, modifications and changes coming within the spirit and scope of the invention as set forth in the appended claims are herein meant to be included.

I claim:

1. Apparatus for code comprising a mated pair of multiplexed, noise-coded, digital signals $(a_i)$ and $(b_i)$ where the number of bits in each said signal equals 2i comprising:

a plurality of code compressor stages connected in tandem;

each said stage having means for compressing an input mated pair connected thereto into an output mated pair having one-half the number of bits of said input mated pair and having the absolute value of each bit amplitude of said output signal equal to twice the absolute value of each bit amplitude of said input signals;

the first one of said code compressor stages having first and second inputs connected to said input mated pair of signals $(a_i)$ and $(b_i)$ respectively; and the other of said code compressor stages having first and second inputs connected to first and second outputs respectively of the preceeding one of said stages for connecting said output mated pair thereto.

2. Apparatus according to claim 1 and wherein:

each said stage has said first input therein connected to one input of a first adder and to the input of a first code sequence inverter;

said second input therein connected to one input of a second adder and to the input of a second code sequence inverter;

each said stage having a signal inverter connected between said first code sequence inverter and a second input of said second adder;

said output of said second code sequence inverter connected to a second input of said first adder: and said first and second outputs of each of said stages connected to the outputs of said first and second adders therein respectively.

3. Apparatus according to claim 1 and wherein:

said first stage has said first input connected to one input of a first adder and the input of a signal inverter;
said second input of said first stage connected to the input of a code sequence inverter;
said code sequence inverter having the output therefor connected to a second input of said first adder and to one input of a second adder;
said signal inverter having the output thereof connected to a second input of said second adder;
the remaining ones of said code compressor stages each having said first input therein connected to a delay means for delaying signals a time period equal to the code length of the signal on said second input therein;
the output of said delay means connected to one input of a first adder and a code inverter therein;
the output of said code inverter connected to one input of a second adder therein;
said second input being connected to a second input of each said first and second adders; and
the outputs of all said first and second adders being connected to said first and second inputs respectively of the succeeding code compressor stage.

* * * * *